United States Patent
Shaanan et al.

(10) Patent No.: US 6,421,846 B1
(45) Date of Patent: *Jul. 23, 2002

(54) ABOVE GROUND SWIMMING POOL

(75) Inventors: Gad Shaanan, Montreal; Walter Francovich, Pierrefonds, both of (CA); Serge Dubeau, Madrid (ES)

(73) Assignee: 2679965 Canada Inc., Quebec (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/259,298

(22) Filed: Mar. 1, 1999

Related U.S. Application Data (63) Continuation-in-part of application No. 08/871,539, filed on Jun. 9, 1997, now Pat. No. 5,875,500.

(51) Int. Cl.⁷ .................................................. E04H 4/04
(52) U.S. Cl. .............................................. 4/506; 52/245
(58) Field of Search ................................. 4/506; 52/245

(56) References Cited

U.S. PATENT DOCUMENTS

| | | | |
|---|---|---|---|
| 3,233,251 A | 2/1966 | Barrera | 52/245 |
| 3,274,621 A | 9/1966 | Diemond et al. | |
| 3,427,663 A | 2/1969 | O'Connell et al. | |
| 3,735,427 A | * 5/1973 | Ancewicz et al. | 4/506 X |
| 3,785,421 A | 1/1974 | Launay | |
| 3,869,736 A | 3/1975 | Valois et al. | |
| 3,874,132 A | 4/1975 | Mendelow et al. | 4/506 X |
| 3,908,330 A | 9/1975 | Frach et al. | 403/348 X |
| 3,974,605 A | 8/1976 | Beatty et al. | |
| 4,035,097 A | 7/1977 | Bachand | 403/348 |
| 4,104,951 A | 8/1978 | Leitner | 403/409.1 X |
| 4,124,907 A | 11/1978 | Laven | 4/506 X |
| 4,167,084 A | 9/1979 | Brunton | 4/506 X |
| 4,413,361 A | 11/1983 | Wolf et al. | 4/506 |
| 5,054,135 A | 10/1991 | Dallaire et al. | 4/506 |
| 5,083,327 A | 1/1992 | Gillebaard | 4/506 |
| 5,155,872 A | 10/1992 | Aymes | 4/506 |
| 5,231,807 A | 8/1993 | Aymes | 4/506 X |
| 5,346,349 A | 9/1994 | Giovannetti | 403/350 X |
| 5,445,472 A | 8/1995 | Oukouchi | 403/348 |
| 5,884,347 A | * 3/1999 | Yurchision et al. | 4/506 |

FOREIGN PATENT DOCUMENTS

FR            2719621     * 11/1995           4/506

\* cited by examiner

*Primary Examiner*—Gregory L. Huson
*Assistant Examiner*—Kathleen J. Prunner
(74) *Attorney, Agent, or Firm*—Birch, Stewart, Kolasch & Birch, LLP (57) ABSTRACT

An above ground swimming pool is made up of a plurality of posts, wherein each post is a blow-molded unit having a base portion and a top portion with a coping seat. A plurality of coping members also blow-molded are each telescopically received one end to the other at the coping seat of the top of each post, and a one-piece fastener engages the overlapping telescopic ends of the coping members to the top of the post. A bracket is provided at the base of the post, the bracket having a rail for receiving track segments wherein an elongated flexible metal wall is inserted. The coping member retains the top of the flexible wall against the post.

8 Claims, 9 Drawing Sheets

Fig. 10

ABOVE GROUND SWIMMING POOL

CROSS-REFERENCE TO RELATED APPLICATION

This application is a continuation-in-part application from application Ser. No. 08/871,539 filed Jun. 9, 1997 now U.S. Pat. No. 5,875,500, issued Mar. 2, 1999.

BACKGROUND OF THE INVENTION

1. Field of the Invention

The present invention relates to an above ground swimming pool, and more particularly, to a swimming pool having an improved coping structure and upstanding posts.

2. Description of the Prior

Present day above ground pools generally have posts and coping structures supporting a single endless side panel forming the lateral pool wall. However, most such structures rely on nuts and bolts to connect together the many elements involved. For an above ground pool whose typical perimeter measures over 80 feet, the number of support posts and coping sections is large, and as a result, the number of nuts and bolts that must be utilized is considerably large. The manipulation of fasteners, such as nuts and bolts, requires an inordinate amount of labor at the site.

Since the support posts and coping elements must form an enclosed loop, the elements forming it must be produced with precision. There can be very little tolerance when erecting a structure whose perimeter would measure over 80 feet.

Examples of previous designs of above ground pools are illustrated in U.S. Pat. No. 3,274,621, Diemond et al, 1966; U.S. Pat. No. 3,869,736, Valois et al, 1975; U.S. Pat. No. 4,413,361, Wolf et al, 1983; and U.S. Pat. No. 5,155,872, Aymes, 1992. Each one of these pools shows the necessity of precision in the fabrication of support posts, coping sections, upper rails and lower rails. Even assuming relatively low tolerances in the fabrication of swimming pool components, imprecise connections will still occur because of the accumulation of small errors over the relatively long perimeter of a pool wall being formed. These problems will occur at the installation phase and must be overcome by altering the last components to be mounted, on site, in order to get the parts to fit.

U.S. patent application Ser. No. 08/871,539 filed Jun. 9, 1997 by the applicant, describes an above ground pool with elements such as support posts, coping components and fastening means, that are molded of plastics material especially employing blow-molding techniques. Said blow-molding techniques being chosen for their structural characteristics and because the elements are hollow, permitting the filling of such elements with sand, water or even concrete, providing further structural integrity. Since it is practically impossible to blow-mold components with small dimensional tolerances, it would not be possible to produce a practical, large, above ground swimming pool made of blow-molded components without allowing for some degree of adjustment of the parts.

The present invention is an improvement over patent application Ser. No. 08/871,539 in that a single type of post may be molded and used to provide lateral support for round and straight sections of the pool wall instead of two different types of posts which are of different design and thus requiring different moulds and inventories.

The present invention is a further improvement over the pool system described in patent application Ser. No. 08/871,539 by improving the telescopic engagement of the coping members leading to improved pool wall integrity.

The present invention further employs an improved single and simple type of fastener to more efficiently deal with the mechanical stresses that may otherwise affect this type of fastener.

SUMMARY OF THE INVENTION

It is an aim of the present invention to provide an above ground pool with improved lateral support posts of a single and simple design but at the same time suited to provide support for both curved and straight sections of the pool wall.

It is a further aim of the present invention to provide upper rails or coping elements, with an improved way of interlocking into each other, through an adjustable telescoping action, with adjustment limiting and locking features that maintain the integrity of the pool wall even with prolonged use and subjection to mechanical stress.

It is a further aim of the present invention to provide an above ground pool having post, coping and lower track components that are manufactured by blow molding techniques.

It is still a further aim of the present invention to provide an above ground pool structure that utilizes a minimum of and preferably no conventional fasteners such as rivets, screws, or nuts and bolts.

It is a further aim of the present invention to provide an improved, simple, one-piece fastener that can be utilized with the components of the present invention. The present fastener design, which eliminates the necessity of using a large number of nuts and bolts, can resist prolonged use and mechanical stress to keep parts fastened.

The single fastener lends itself to a unique tool for tightening or unlocking the fastener.

In one aspect of the present invention, a kit for an above ground pool is provided comprising a plurality of hollow posts each molded in one piece from plastics material and having a base portion and a top portion with a coping seat, the base portion having a cross-sectional dimension that is greater than a cross-sectional dimension of the top portion, a plurality of hollow coping elements each molded in one piece from plastics material and having one end with a female coupling member and the other end of the coping member having a male coupling member adapted to engage the female coupling member, and a fastener adapted to engage the male and female coupling members when they are coupled end to end and coincident with the coping seat on the top of one of the posts, whereby the fastening member will engage the post and fix the male and female coupling members of adjacent coping members, the kit also including a pool panel and a pool liner adapted to be supported by the coping so formed.

One aspect of the present invention comprises a kit for an above ground pool, including a plurality of support posts with each molded in one piece from plastics material and having a base portion and a top portion with a coping seat. A support augmentation member is associated with each support post to be anchored in the ground and to be attached to the respective support post in order to provide augmented lateral support for straight sections of the pool wall.

In another aspect of the present invention there are a plurality of coping elements, each molded in one piece from plastics material, comprising a female coupling member at one end and a male coupling member at the other. The male coupling member of the coping element being longitudinally slotted and adapted for telescopic engagement with a female coupling member, wherein the female coupling member includes a socket for receiving the male coupling member.

More specifically, the socket is defined by a top wall and side walls, the top wall defining an opening coincident with the slot in the male coupling member, the side walls including locking means within the socket cooperating with complementary locking means on the male coupling member for locking the male coupling member and the female coupling member at a selected telescopic position.

In yet another aspect of the present invention a one-piece fastening member is provided to engage the coupled male and female coupling members coincident with the coping seat on the top of the support post whereby the fastening member will extend through the opening in the female coupling member, the slot in the male coupling member and an opening in the coping seat on the support post to engage the support post, the male and female coupling members of adjacent coping members and to keep these members joined together.

Such an above ground pool kit also includes bottom rail sections, a pool panel, and a pool liner adapted to be supported by support posts and the coping so formed.

In another aspect of the present invention a kit is provided for an above-ground liquid containing pool comprising posts to be spaced apart, coping members adapted to extend between each post, characterized in that the posts and coping members are hollow, one-piece, blow molded parts with at least the posts being filled with ballast material.

The present invention also includes a method of manufacturing components for an above ground pool kit that comprises a plurality of posts adapted be spaced apart and upstanding and coping members to be joined end to end at the top of each posts including the steps of molding each post and coping member by blow molding techniques in order to provide finished components for the kit.

BRIEF DESCRIPTION OF THE DRAWINGS

Having thus generally described the nature of the invention, reference will now be made to the accompanying drawings, showing by way of illustration, a preferred embodiment thereof, and in which:

FIG. 2b is a vertical cross-section of an element shown in FIG. 2a;

FIG. 3b is an enlarged fragmentary horizontal cross-section showing the detail of FIG. 3a;

DESCRIPTION OF THE PREFERRED EMBODIMENTS

Figure 1:
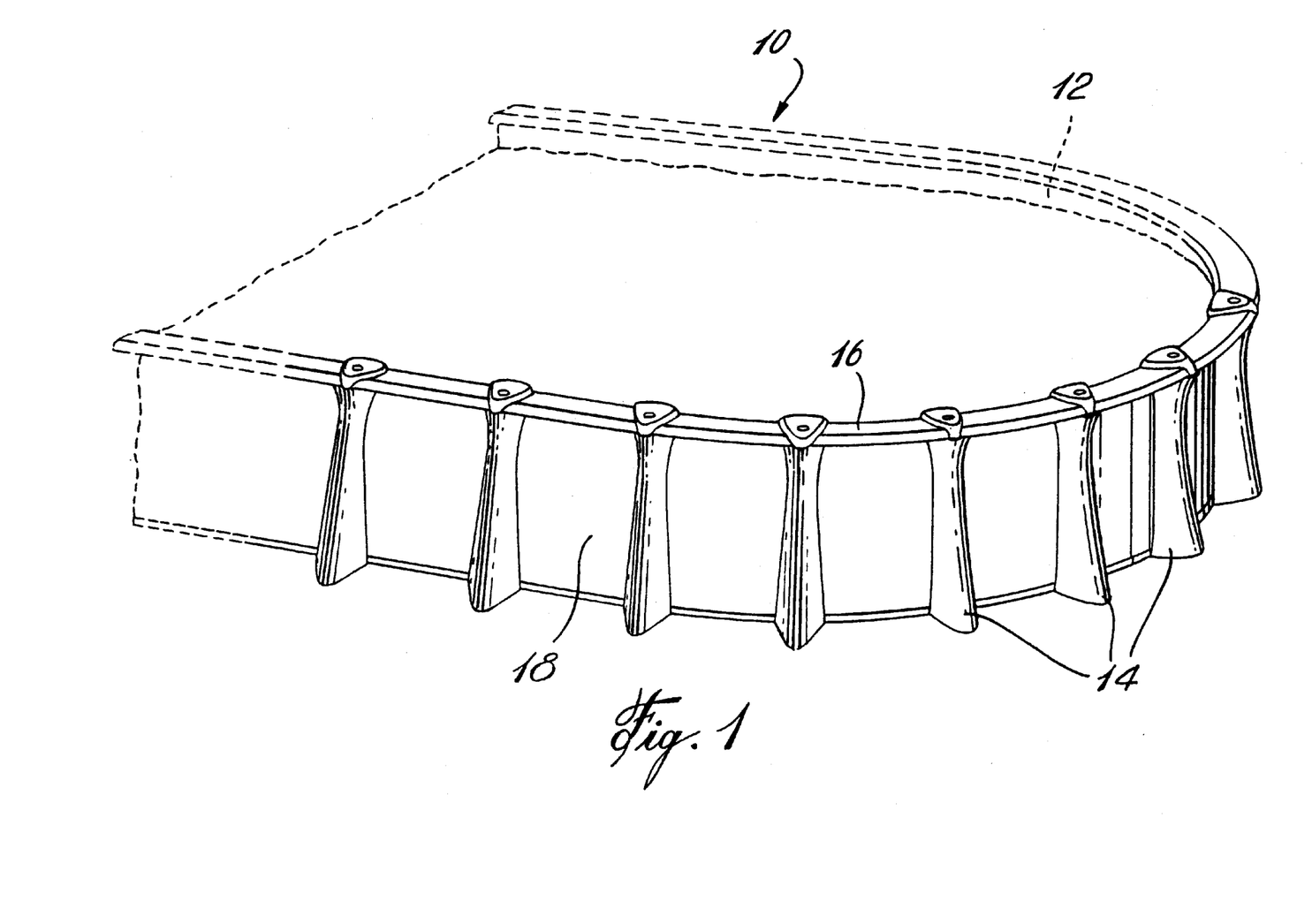
FIG. 1 is a perspective view of an above ground pool, partly in dotted lines, including elements in accordance with the present invention.

Referring to the FIG. 1, there is shown an above ground swimming pool 10 forming an obround loop. The pool is shown with a typical pool liner 12, pool wall 18 and a structure comprising upstanding support posts 14 as well as coping elements 16 extending between said support posts 14.

Figure 2A:
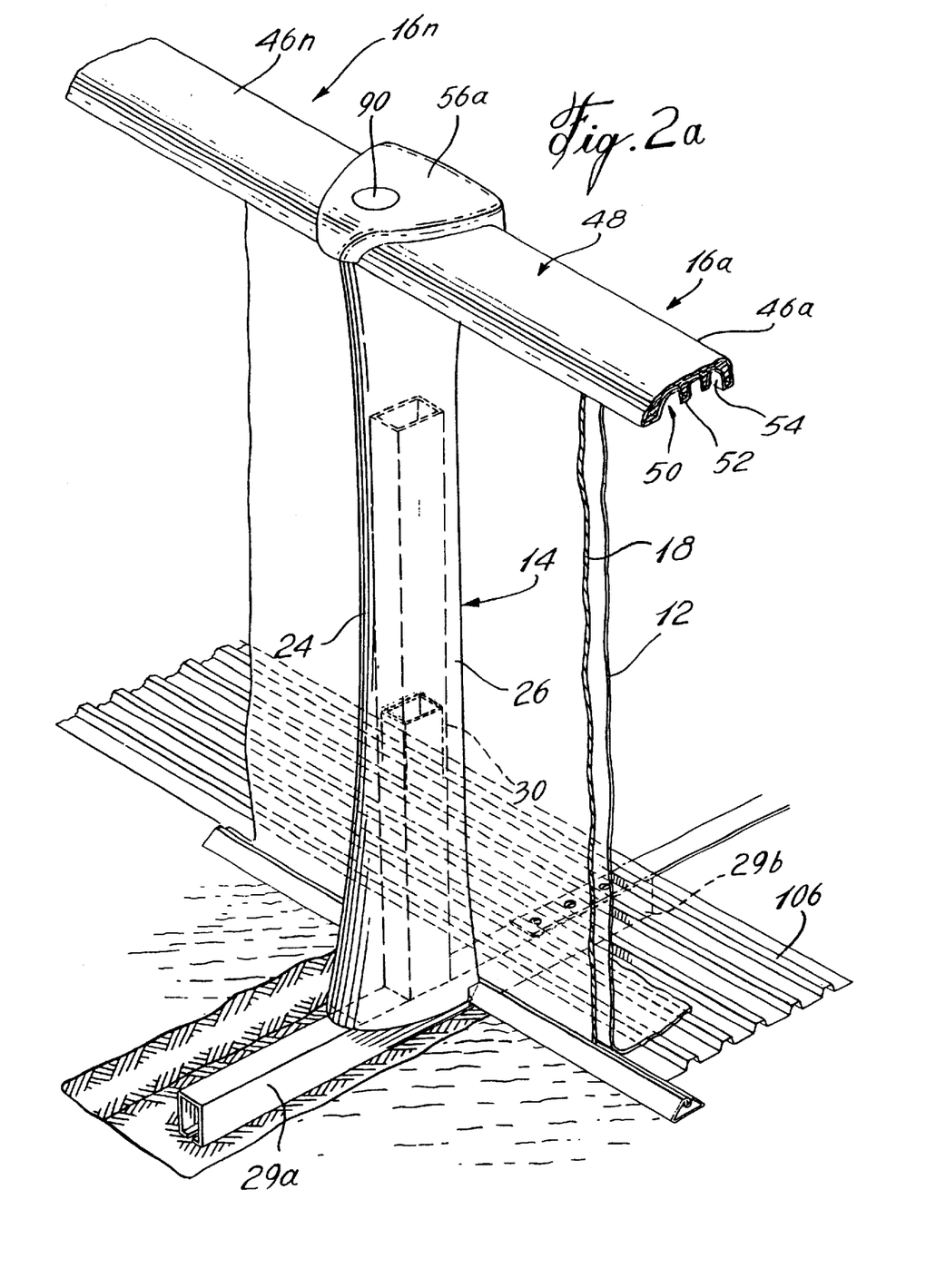
FIG. 2a is an exploded perspective view of a detail of the present invention.
Figure 2B:
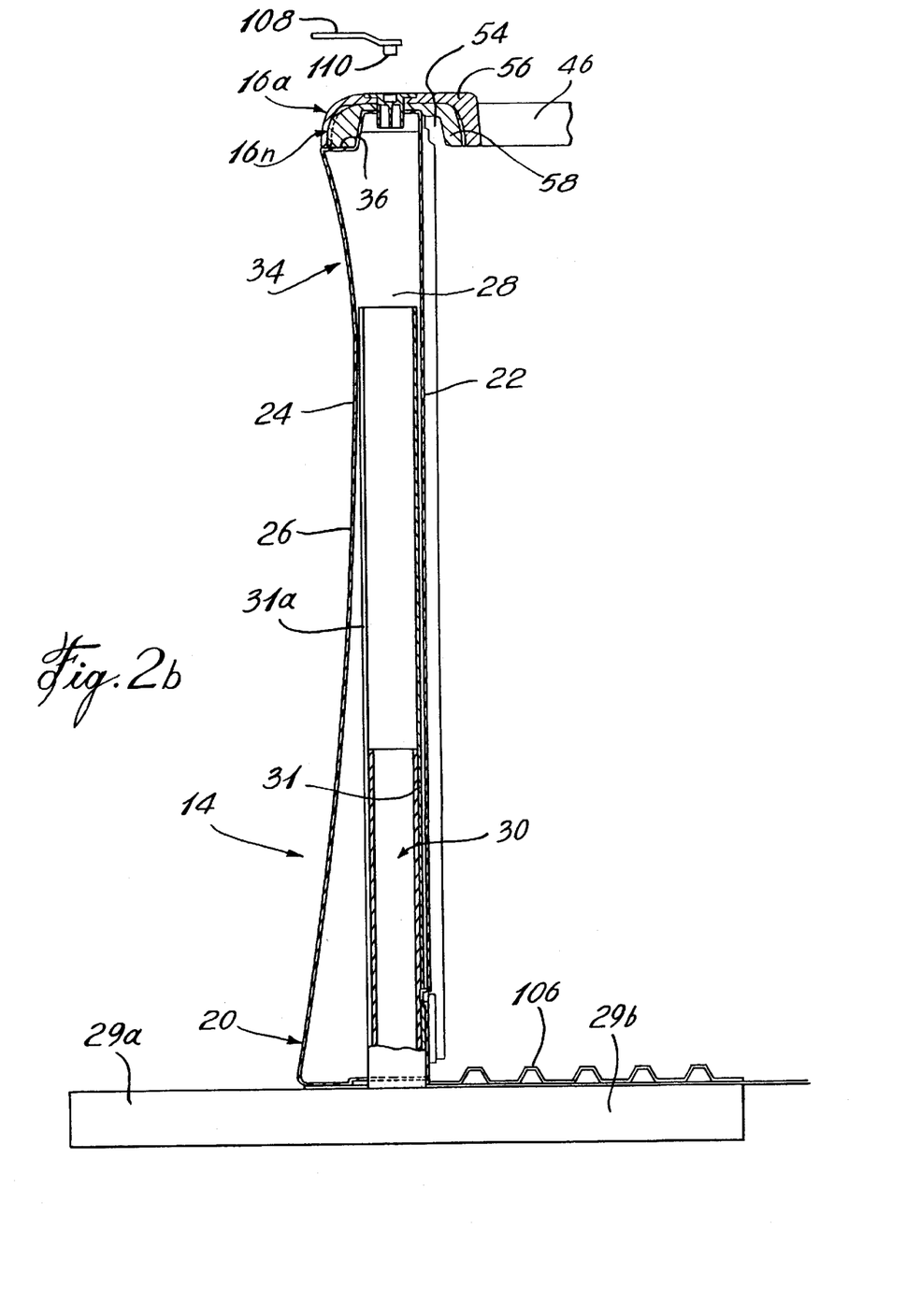
Figure 7:
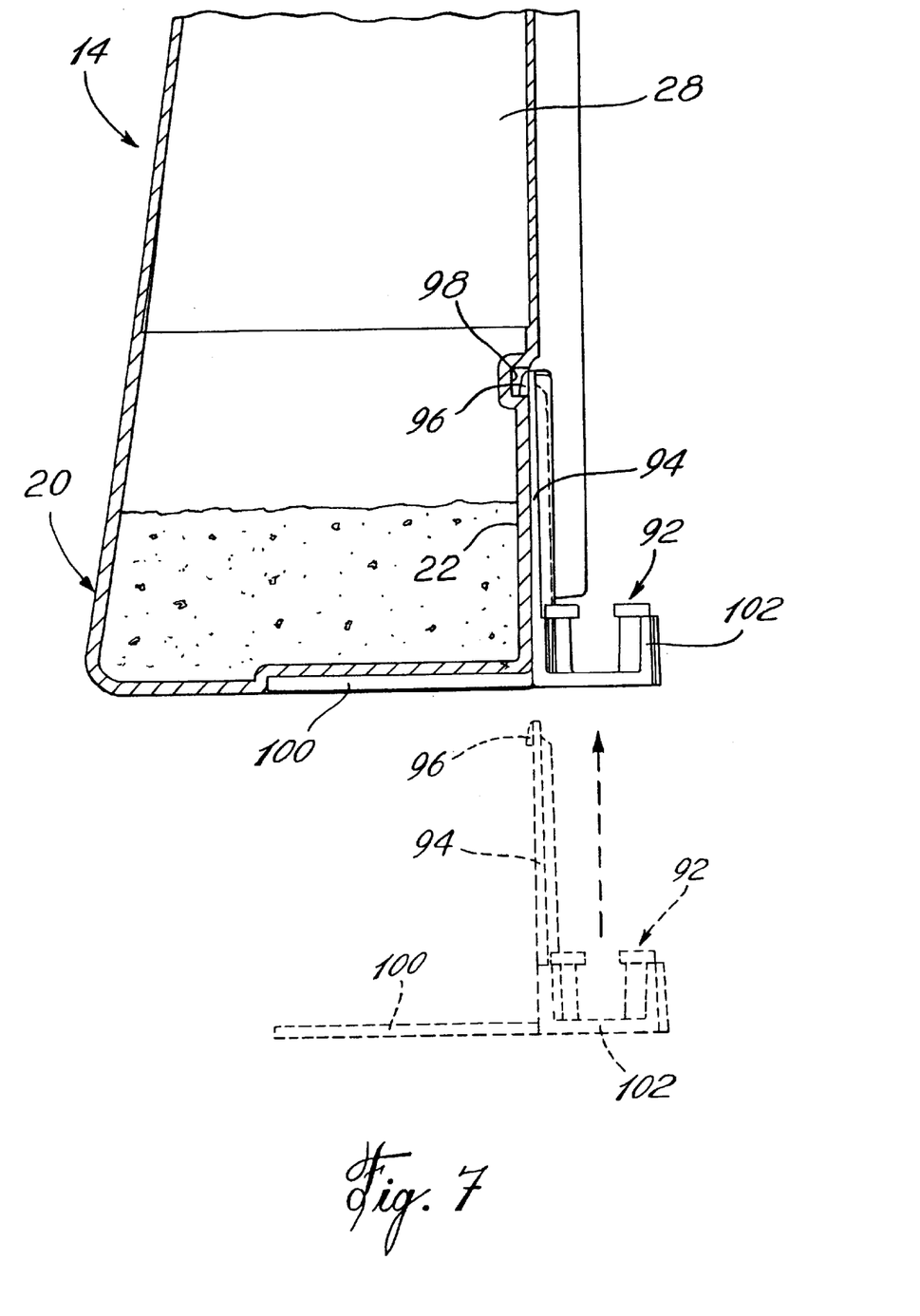
FIG. 7 is an enlarged fragmentary vertical cross-section taken through the detail shown in FIGS. 2a, 2b.

FIGS. 2a and 2b show a typical support post 14 mounting coping members 16. The support post 14 comprises an elongated upstanding blow-molded plastic member having a base 20, an anterior wall 22 which is a planar flat wall, a curved posterior wall 24, and lateral walls 26. The support post 14 is hollow, as shown at 28 in FIGS. 2b and 7a, and made by blow-molding which allows a ballast such as water, sand or concrete to be injected into the hollow interior 28 of the support posts 14, when erected, in order to give the pool elements stability and strength.

The support post 14, shown in FIGS. 2a and 2b, is adapted to support the straight wall sections of an obround pool 10 by employing a support augmentation member 30. Member 30 is anchored in the ground to provide a greater support for straight sections of a pool wall. The support augmentation member 30 may be T-shaped having a horizontal base 29a, 29b and an upstanding stem 31 extending through an opening in the base 20 of the support post 14 into the hollow interior 28. The stem 31 may have an extension 31a.

Figure 10:
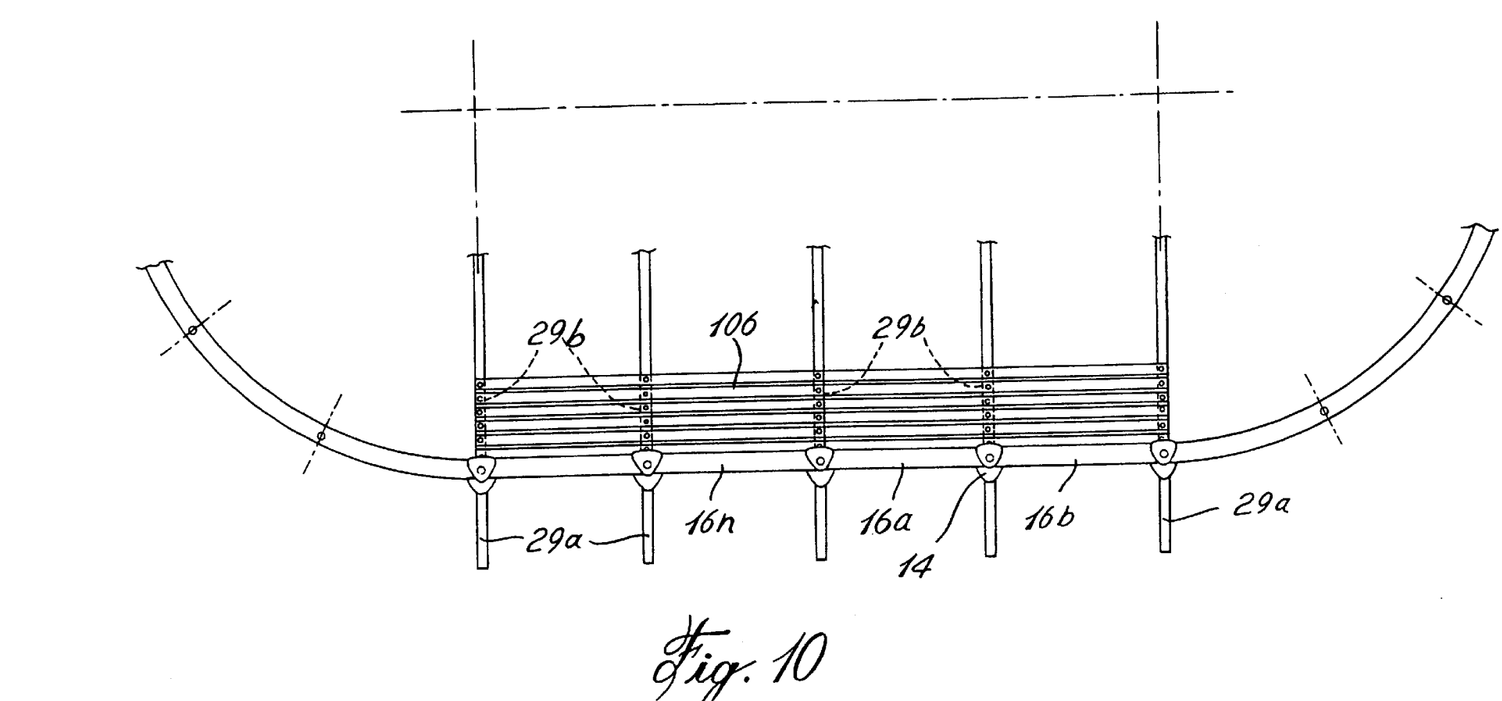
FIG. 10 is a fragmentary top plan view of an embodiment of the pool in an assembled position and illustrating a detail shown in FIGS. 2a and 2b.

As shown in FIGS. 2a, 2b and 10, a corrugated floor panel 106 can extend adjacent a straight wall portion and sit on the horizontal base member 29b as shown. When water is in the pool the weight thereof will enhance the stability of the posts 14.

Figure 3A:
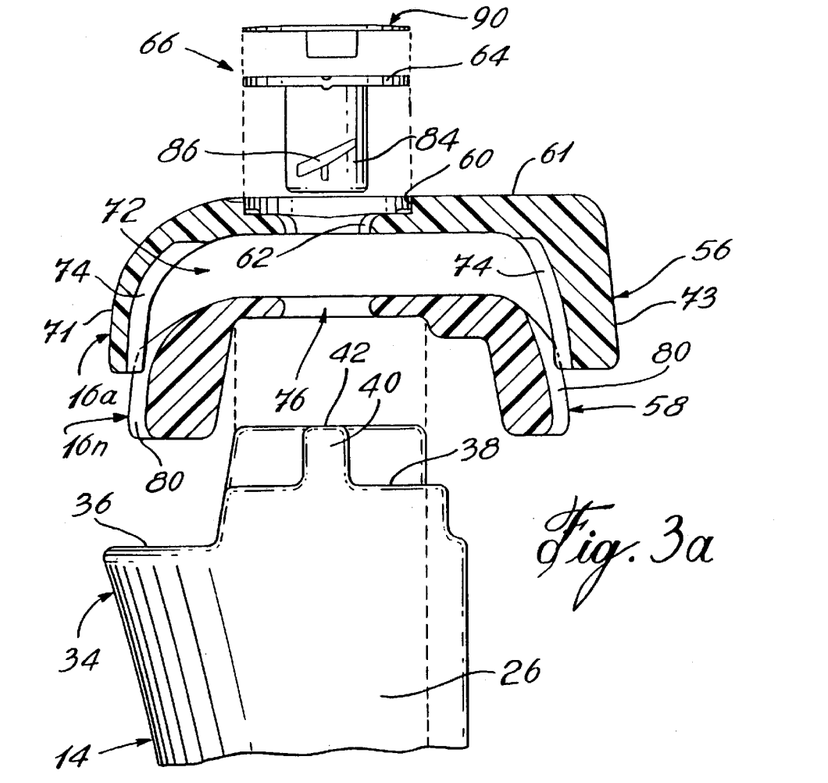
FIG. 3a is a fragmentary enlarged vertical cross-section of a detail of the present invention.
Figure 5:
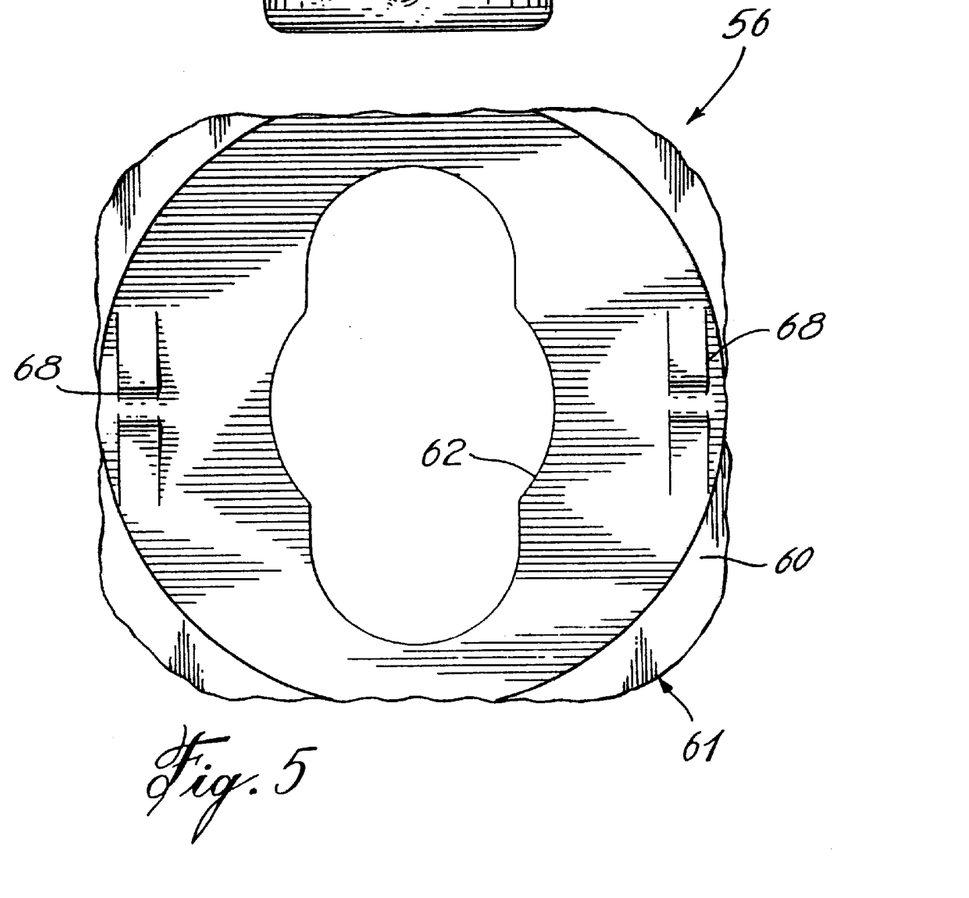
FIG. 5 is a top plan view of a detail of the present invention.

As shown in FIG. 3a, the support post 14 has a coping seat 34 defined by stepped shoulders 36 and 38, and an upstanding member 40 having a mounting opening 42. The mounting opening 42 is formed by the intersection of an elongated opening and a circular central opening similar in detail to the opening 62 as shown in FIG. 5.

As shown in FIG. 2a the coping member 16 (16a), including female coupling member 56 (56a), may also be made from a blow-molding process of a plastics material. The coping member 16 may be linear or curved depending on its position along the swimming pool wall. However, each coping member 16a . . . 16n has a beam structure, 46a . . . 46n with an upper surface 48 and an under surface 50. The upper surface 48 is normally smooth without any sharp corners while the under surface 50 may be provided with different strengthening ribs 52 and normally a recess 54 for receiving the pool wall 18 and liner 12. The coping member 16a . . . 16n, being hollow, may be filled with a strengthening material such as a foam injected therein.

Figure 3B:
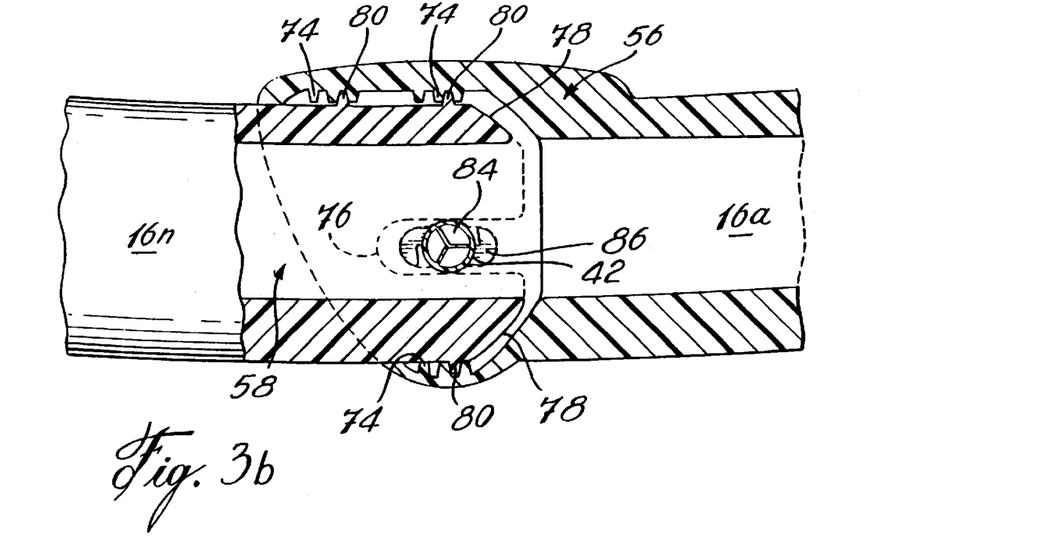

As shown in FIGS. 3a and 3b, the coping member 16a . . . 16n includes a female coupling member 56 at one end thereof and a male coupling member 58 at the other end thereof. The female coupling member 56 comprises an upper wall 61 having a recessed portion 60 concentric with a mounting opening 62. When the female mounting member 56 is mounted on the support post 14, the mounting opening 62 would be coincident with mounting opening 42 of the coping seat 34 of the support post 14.

The female coupling member 56 also comprises side walls 71 and 73 to define a socket 72 to receive the male coupling member 58. On the interior surfaces of the side walls 71 and 73 there are a set of retaining ribs 74 defining grooves used for adjustable engagement with a male coupling member 58. The male coupling member 58 defines an elongated open slot 76 with tapered ends 78 and retaining ribs 80 which engage in the grooves formed between ribs 74 in order to provide adjustable engagement between coupling members 56 and 58 of coping members 16.

The kit for erecting a pool includes several coping members 16a to 16n. More specifically, the male coupling member 58 of coping member 16n is inserted into the socket 72 of the female coupling member 56 of coping member 16a in a telescopic manner thus providing adjustment along the direction of the pool wall. This adjustment is limited and locked by the retaining ribs 80 on the male coupling member 58 and retaining ribs 74 of the walls 71, 73 on the female coupling member 56 which engage into each other.

When the pool wall is erected the slot 76 will be aligned with the mounting openings 42 and 62 in order to receive a fastening member 66.

Figure 4:
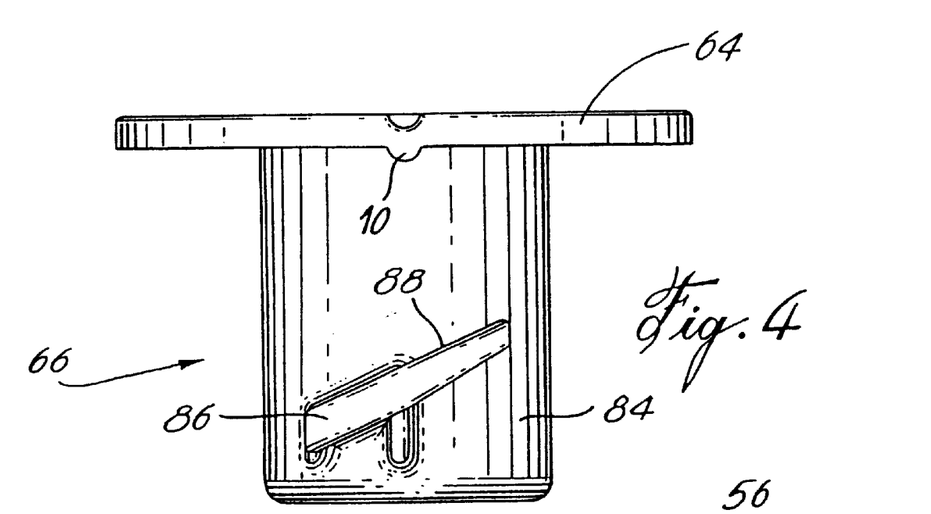
FIG. 4 is a side view of a detail of the present invention.
Figure 6A:
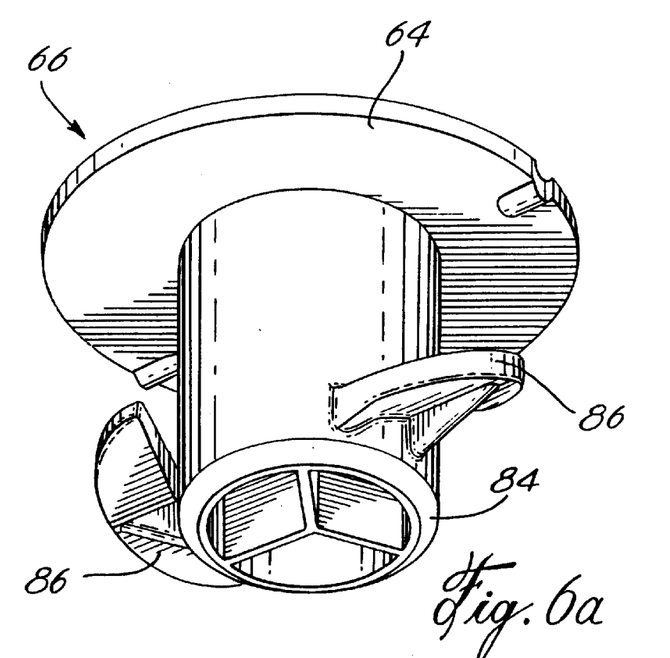
FIGS. 6a and 6b are perspective views of a detail of the present invention shown in FIG. 4.
Figure 6B:
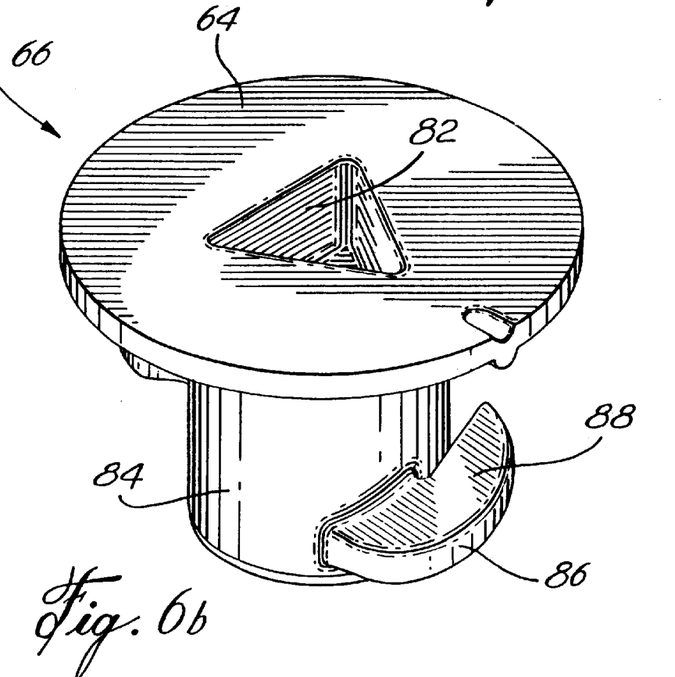

As shown in FIGS. 4, 6a and 6b, the fastening member 66 includes a cap 64 with a socket 82 on its top face to receive a tool 108 used to mount the fastener. The tool 108 has an engagement projection 110 adapted to engage the socket 82. A stem 84 extends downwardly from cap 64, and a pair of diametrically opposed wings 86 extend outwardly from the side of the stem 84 near its bottom. The wings 86 include camming surfaces 88. The wings 86 are also cantilevered thus allowing a certain resilience.

When it is desired to connect a pair of coping members 16a and 16n with a support post 14; the coping member 16n, with its male coupling member 58, is inserted into the socket 72 of the female coupling member 56, and the male member 58 is adjusted telescopically therein. Adjustment along the pool wall is maintained by the retaining ribs 80 on the male coupling member which interlock with retaining ribs 74 on female coupling member 56.

The fastener member 66 is then inserted through the opening 62 with the wings 86 aligned with the major axes of the elongated openings 42 and 62, as shown in FIGS. 3b and 5. The fastener 66 is pushed down until the wings 86 are inside the support post 14, that is, through the mounting opening 42. The fastener 66 is then rotated (90°) by means of the suitable tool 108 inserted in the socket 82. By rotating the fastener member 66, the camming surfaces 88 will resiliently engage the interior of the coping seat 34 and the cap 64 will sit in the recess 60 on the top surface of the female coupling member 56 to tightly sandwich the elements together. The recess 60 of the female coupling member 56 provides two diametrically opposed lock depressions 68, seen in FIG. 5. The fastening member 66 once attached is prevented from rotating backwards by the rib 70 seated in the lock depressions 68 of the female coupling member 56.

Once the fastener 66 is engaged, the socket 82 remains exposed and could otherwise be covered by an aesthetic cap member 90.

Figures 8, 9:
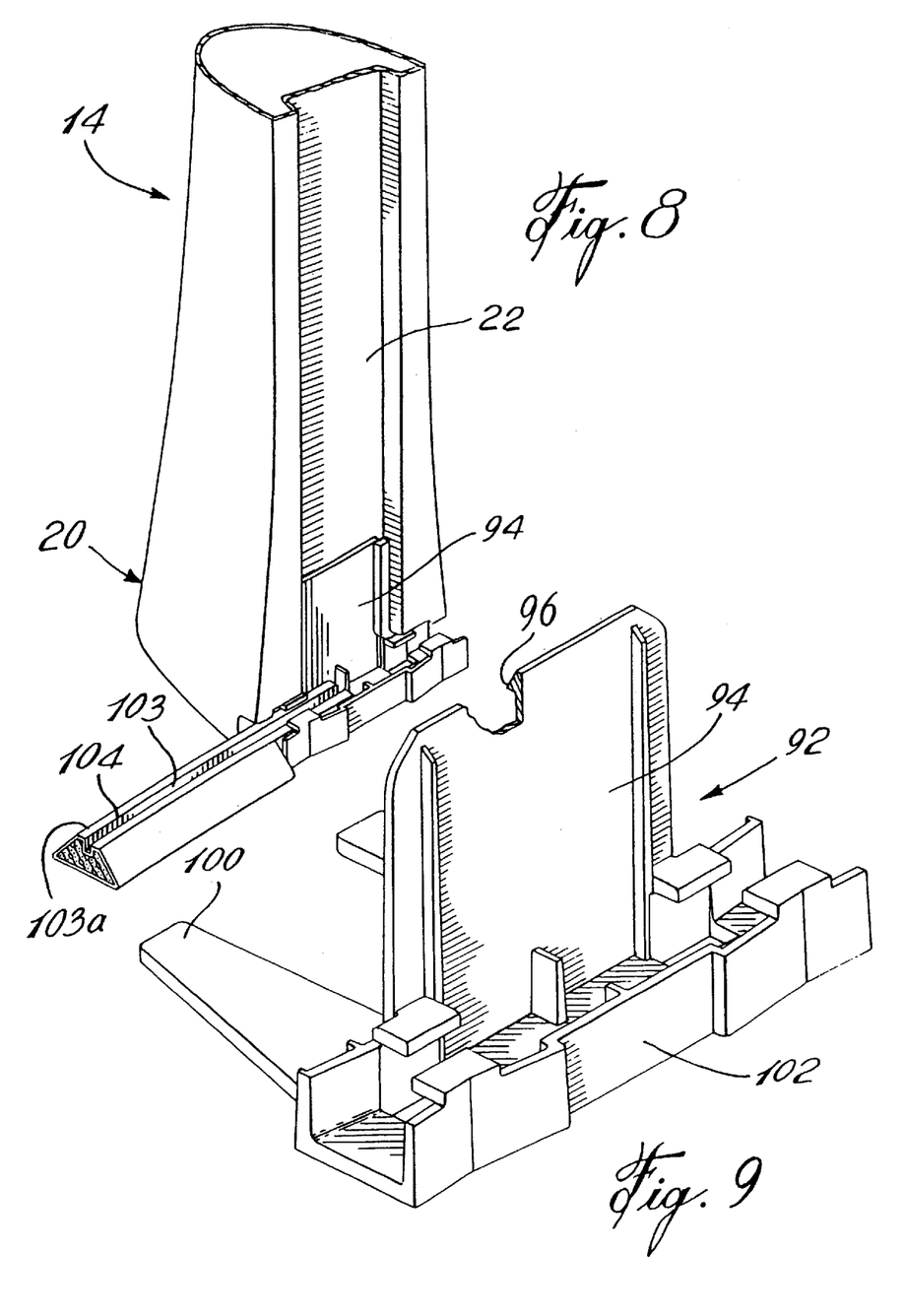
FIG. 8 is a perspective fragmentary view of the detail shown in FIG. 7.
FIG. 9 is an enlarged perspective view showing a detail of FIGS. 7 and 8.

A bracket 92 is provided at the base of the post 14 (FIGS. 7, 8, and 9). The bracket 92, as seen in FIG. 9, includes an upstanding portion 94 with a spring hook 96 adapted to engage in a recess 98 (FIG. 7) in the anterior wall 22 of the base 20 of a typical support post 14. The bracket 92 also includes two fork members 100, forming the base of the bracket 92, which can extend under the base 20 of the support post 14 allowing the support augmentation member 30 to extend in between the fork members 100. A box shaped rail 102 extends anteriorly from the upstanding member 94 of the bracket 92.

The bracket 92 is thus snap fastened into the base 20 without the need of fasteners of any type. This feature contributes to efficiency and ease of assembly of the present embodiment of the invention.

Track segments 104 are telescoped in and connected to the rail 102. A track segment 104 extends end-to-end between two support posts 14 and is adapted to receive the pool wall 18 in a groove 103. The track segment 104 is preferably blow molded, in the present embodiment with a trapezoidal cross-section, and is hollow in order to be injected with a ballast, such as concrete. The rear lip 103a may be raised slightly in order to reduce the chances of the wall 18 popping out of the track in cold weather conditions.

An elongated flexible metal panel forming the pool wall 18 would typically be inserted in track segments 104, and the top edge would be retained within the pool wall retaining recess 54 in the coping 16 when the coping is mounted onto support posts 14.

A pool liner 12 with the bead (not shown) overlaps the top edge of a pool wall panel 18 within the pool wall retaining recess 54.

We claim:

1. A kit for an above ground pool comprising:
a plurality of posts, each post having a base portion and a top portion with a coping seat, the base portion having a cross-sectional dimension that is greater than a cross-sectional dimension of the top portion;
a plurality of coping members each having one end with a female coupling member and the other end having a male coupling member adapted to engage the female coupling member, the female coupling member having a fastener opening;
a pool panel and a pool liner adapted to be supported by the coping members when assembled and a plurality of fasteners adapted to engage the male and female coupling members when they are coupled end to end and coincident with the coping seat on the top of one of the posts, whereby a respective fastener will engage the post and fix the male and female coupling members of adjacent coping members; the improvement residing in that each post is hollow, tubular, one-piece and of variable cross section and is capable of receiving ballast while being molded from plastics material.

2. A kit as defined in claim 1, wherein the coping seat at the top of the post includes an elongated opening, the opening in the female coupling member of the coping member is a similar elongated opening, the male coupling member includes an elongated slot and when adjacent coping members are mounted to form a joint on the coping seat of the post, the elongated opening in the female coupling member coincides with the elongated opening in the coping seat of the post, and the elongated slot of the male coupling member is aligned with the coincident openings, each fastener includes a cap portion, a stem portion, and a pair of diametrically opposed wings extending from the stem portion such that when the fastener is inserted in the coincident openings, the stem portion and the wings can be inserted with the wings aligned with the elongated openings, the fastener can then be rotated to lock the coping seat, male coupling member, and female coupling member together.

3. A kit as defined in claim 1, wherein the male coupling member of each coping member defines an elongated slot and the male coupling member can be telescoped longitudinally while the elongated slot remains aligned with said opening in order to provide linear adjustment of the coping members.

4. A kit as defined in claim 3, wherein the female coupling member of each coping member is shaped as a socket to receive the male coupling member of the adjacent coping member, wherein on an interior surface of the socket of the female coupling member there are a set of retaining ribs forming grooves into which another set of retaining ribs located on the outer surface of the male coupling member engage to provide limited adjustment between coping members.

5. A kit for an above ground pool comprising a plurality of posts, each having a base portion and a top portion with a coping seat, the base portion having a cross-sectional dimension that is greater than a cross-sectional dimension of the top portion, a plurality of coping members each having one end with a female coupling member and the other end having a male coupling member adapted to engage the female coupling member, the female coupling member having a fastener opening, a pool panel and a pool liner adapted to be supported by the coping members when assembled and a plurality of fasteners adapted to engage the male and female coupling members when they are coupled end to end and coincident with the coping seat on the top of one of the posts, whereby the fastener will engage the post and fix the male and female coupling members of adjacent coping members; the improvement residing in that the posts are each hollow, one-piece and of variable cross section while being molded from plastics material and wherein a bracket is provided at the base portion of each post and the bracket defines an L shaped member having an upstanding leg provided with a spring hook element, the base portion is provided with a recess provided in a wall thereof for receiving the upstanding leg and hook element.

6. A kit for an above-ground swimming pool comprising spaced apart upstanding posts supporting coping members extending between each post, a pool wall and a pool liner supported by the posts and coping members characterized in that the posts are each hollow, tubular, one-piece and of variable cross section and capable of receiving ballast while being molded from the plastics material.

7. A kit for an above-ground swimming pool as defined in claim 6 wherein the coping members and posts are each formed by blow molding.

8. An above-ground swimming pool comprising spaced apart upstanding posts supporting coping members extending between each post, a pool wall and a pool liner supported by the posts and coping members, the posts and coping members being hollow, one-piece, molded parts with at least the posts being filled with ballast material wherein the coping members each include female and male coupling members at each respective end and the coping members are joined together at the top of a post and are connected to the post by a single fastner member characterized in that the fastner member includes a stem portion and a pair of diametrically opposite camming wings while the coupling members and the top of the post have aligned holes to allow the fastner member to extend through the aligned holes and for the wings to engage the interior of the top of the post in order that the fastner member engages and locks the coping members and the top of the post.

* * * * *